Patented Apr. 27, 1937

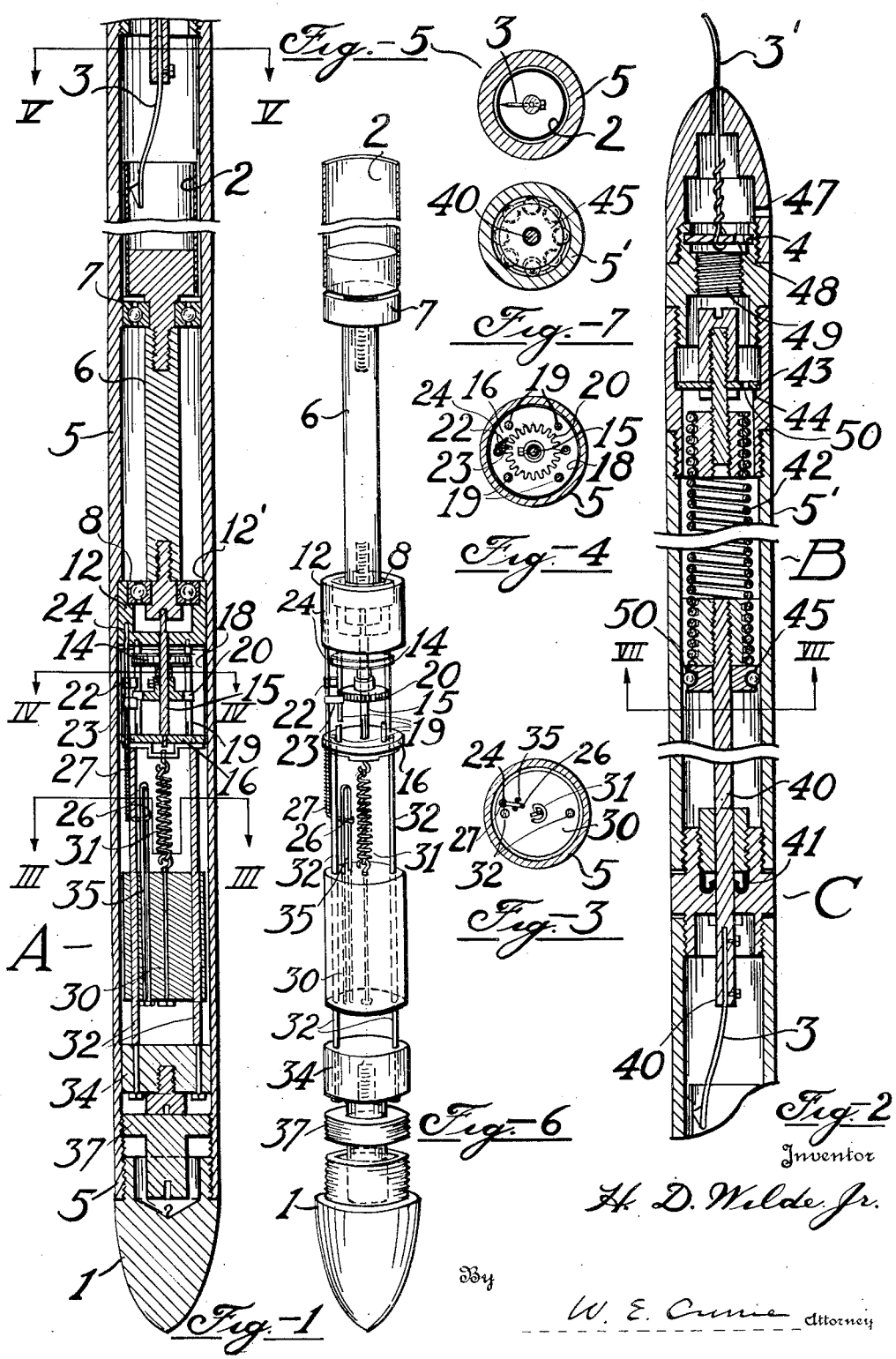

2,078,623

UNITED STATES PATENT OFFICE 2,078,623

PRESSURE RECORDING DEVICE

Henry D. Wilde, Jr., Houston, Tex., assignor to Standard Oil Development Company, a corporation of Delaware Application December 21, 1931, Serial No. 582,331

3 Claims. (Cl. 234—20)

This invention relates to improvements in gauge devices such as are used for measuring the pressure at the bottom of an oil well. The invention will be fully understood from the following description taken in connection with the accompanying drawing in which latter—

Fig. 1 is a longitudinal sectional view of a fluid tight recording chamber of a well pressure gauge.

Fig. 2 is a longitudinal sectional view of the spring containing chamber of the well pressure gauge.

Fig. 3 is a transverse sectional view taken along the line 3—3 of Fig. 1.

Fig. 4 is a transverse sectional view taken along the line 4—4 of Fig. 1.

Fig. 5 is a transverse sectional view taken along the line 5—5 of Fig. 1.

Fig. 6 is a perspective view of the contents of the recording chamber, and

Fig. 7 is a transverse sectional view taken along the line 7—7 of Fig. 2.

Referring particularly to the drawing, a casing for a well pressure gauge is shown comprising a section A which constitutes a closed-in recording chamber and a section B which constitutes a spring containing chamber opening to the atmosphere. Sections A and B are united at their adjoining ends by means of a wall or plug C which has screw threaded engagement with the sections. The recording chamber is closed at opposite ends by means of a nose plug 1 and the plug C whereby the contents of the recording chamber are maintained at any desired pressure such as atmospheric pressure. The recording section contains a cylindrical recording drum 2 which is mounted for rotation within the casing and is driven by suitable mechanism to be later described. A stylus 3 engages recording material disposed upon the inner surface of the cylindrical drum 2 and records the difference in pressure between the interior of the chamber B and the interior of the recording chamber A. The stylus is suitably supported by a mechanism to be later described for movement parallel with the longitudinal axis of the casing to record variations in the relative pressures of the fluid contents of the chambers. The pressure gauge is particularly adapted for use in a vertical position such as in an oil well or the like and is suspended by means of a cord 3' and plate 4.

The position of the stylus is recorded by means of a line formed by the stylus upon the recording paper and extending at right angles to the longitudinal axis of the recording drum. The recording drum is driven in rotation a fraction of a revolution whenever a pressure reading is desired, whereby the stylus draws a short line upon the paper and the distance between this line and a base line drawn on the chart when the pressure in the spring containing chamber is atmospheric is a measure of the pressure at the time the recording drum is rotated. The recording drum is mounted upon a shaft 6 which in turn is rotatably supported by ball bearings 7 and 8. A bearing case 12 supports the ball bearing 8 and is secured in position against a shoulder 12' within the casing 5.

The recording drum shaft 6 is driven in rotation by means of a main spring 14 which actuates an escapement shaft 15. Escapement shaft 15 is rotatably supported at its opposite ends in bearing case 12 and plate 16. The end of the shaft 15 extending through bearing case 12 drives the recording drum shaft 6. A housing 18 extends from the bearing case 12 to the plate 16. Escapement frame rods 19 extend from the bearing case 12 to the plate 16 and support the main spring 14. An escapement wheel 20 is fixed to the escapement shaft 15 and rotates with the shaft. The tension of the main spring 14 tends to normally drive the recording drum 2 and escapement wheel 20 in rotation.

Rotation of the recording drum and escapement wheel is normally prevented by means of a latching device including escapement stops 22 and 23 which are carried by an escapement stop rod 24. Escapement stops 22 and 23 project from the escapement stop rod at an angle of approximately 45 degrees to each other and are spaced longitudinally of the stop rod. The escapement stop rod is mounted for reciprocating movement transversely of the plate 16 and bearing case 12. The escapement stop rod projects through the plate 16 and terminates in a hook shaped portion 26. The escapement stop rod is normally maintained in position with stop 23 engaging a tooth of the escapement wheel 20 by means of a helical spring 27 which is secured at one end through a hole in plate 16 and is secured at its opposite end to the escapement stop rod 24.

Escapement stop rod 24 is drawn downwardly to disengage stop 23 from the escapement wheel 20 and permit rotation of the recording drum by means of a weight 30 which is suspended for vertical oscillation by means of a helical spring 31 from the plate 16. Spacer rods 32 extend from the plate 16 through the weight 30 and are secured to a base 34. A U shaped rod 35 projects upwardly from the weight 30 in position to engage with the hooked portion 26 of the escapement rod upon downward movement of the weight. An adjustable stop 37 threaded into the casing 5 maintains the assembly in position.

The entire instrument is suspended on the wire line 3' and is lowered by means of this line to the bottom of an oil well or to whatever depth at which a pressure measurement is desired. The spring 31 suspending the weight 30 is sufficiently strong so that the acceleration and deceleration of the instrument incident to running it in the well is not sufficient to cause the weight to reach the bottom of its travel and trip the escapement. When it is desired to turn the chart and get a reading of the instrument, the instrument is allowed to fall free for a short distance and its fall suddenly checked. This jerking is sufficient to cause the weight 30 to travel the full distance and trip the escapement, thereby rotating the chart a definite fraction of a revolution.

As the weight 30 approaches its bottom position, it pulls down the escapement stop rod 24 a distance sufficient to release the stop 23 from engagement with the toothed wheel 20, and sufficient to bring the stop 22 into the path of the teeth of the wheel 20.

During this interval, the spring 14 rotates the wheel 20 one notch until the next tooth engages and is stopped by the stop 22. With the return of the weight 30 to its initial position, spring 27 now moves the rod 24 to its initial position and the stop 23 engages with the last mentioned tooth. This procedure is repeated during succeeding strokes of the weight 30.

The stylus is moved in the casing parallel with the longitudinal axis of the casing to record the difference in pressure between the contents of the spring-containing or open chamber B and the recording or closed chamber A. The stylus is supported by a piston 40 which extends slidably through a packing gland 41 in the plug C into the open chamber B of the casing. The packing gland 41 permits free longitudinal reciprocating movement of the piston 40 while preventing fluid communication between the chambers A and B. The piston 40 is suspended by one end of a helical spring 42 some of the helical coils of which grip the head of the piston and the opposite end of which is in turn supported in fixed position by means of a washer 43. The washer 43 rests on a shoulder 44 which protrudes into the inner surface of the open chamber. A ball bearing guide 45 is attached to the end of the piston 40 adjoining the spring 42 and functions to keep the piston at all times in line with the longitudinal axis of the instrument whereby it can be reciprocated freely through the packing gland 41. The interior of the open chamber communicates with the atmosphere through an opening 47 in the side walls of the casing. The pressure to be measured is transmitted into the open chamber through the opening 47, through an opening 48 in plate 4, opening 49, and openings 50 in washer 43 and between the ball bearings and the guide 45 into position to bear against the piston 40. The pressure upon the piston 40 tends to force the piston out of the chamber through the packing gland 41 until the tension in the spring 42 balances the forces tending to push the piston out. The distance which the piston has travelled is a measure of the difference in pressure within the open chamber B and the closed or recording chamber A. Before running the instrument in a well the open chamber is filled with liquid such as clean lubricating oil whereby the possibility of the entrance of dirt, grit and the like into the open chamber is reduced.

Various changes may be made within the scope of the appended claims in which it is desired to claim all novelty inherent in the invention as broadly as the prior art permits.

I claim:

1. A gauge device, comprising a casing having a closed chamber and a chamber opening to the atmosphere, a wall separating the chambers, record receiving means disposed in the closed chamber, marking means extending slidably from the open chamber through the wall in fluid tight relation with respect to the wall into engagement with the record receiving means and spring means in the open chamber suspending the marking means whereby variation in fluid pressure within the open chamber alters the position of the marking means with respect to the record receiving means.

2. A gauge device, comprising a casing having a closed chamber and a chamber opening to the atmosphere through an opening in its side wall, the open chamber containing liquid, a wall separating the chambers, record receiving means disposed in the closed chamber, marking means extending slidably from the open chamber through the wall in fluid tight relation with respect to the wall into engagement with the record receiving means, and spring means in the open chamber suspending the marking means whereby variation in fluid pressure within the open chamber alters the position of the marking means with respect to the record receiving means.

3. A gauge device, comprising a casing having a closed chamber and a chamber opening to the atmosphere, a wall separating the chambers, record receiving means disposed in the closed chamber, a stylus in the closed chamber engaging the record receiving means, a piston associated with the stylus extending through the wall in fluid tight relation with respect to the wall from the open chamber into the closed chamber, a helical spring in the open chamber attached at one end to the wall of the chamber and at its other end suspending the piston whereby variation in fluid pressure within the open chamber alters the position of the stylus with respect to the record receiving means.

HENRY D. WILDE, Jr.